No. 749,761. PATENTED JAN. 19, 1904.
F. L. O. WADSWORTH.
ILLUMINATING PRISM PLATE.
APPLICATION FILED APR. 25, 1898.
NO MODEL.
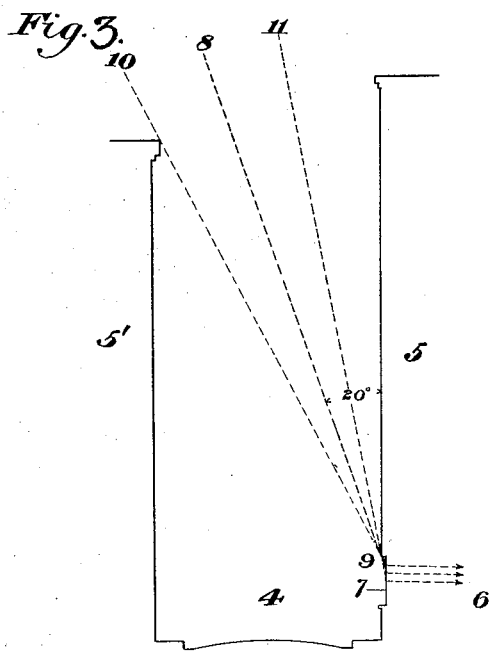
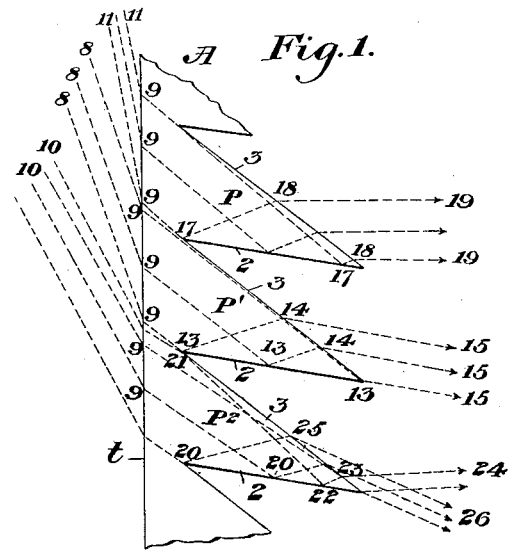
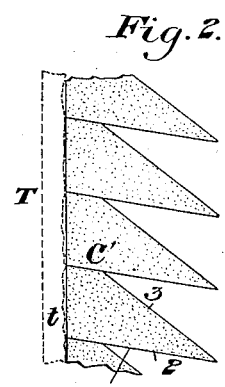
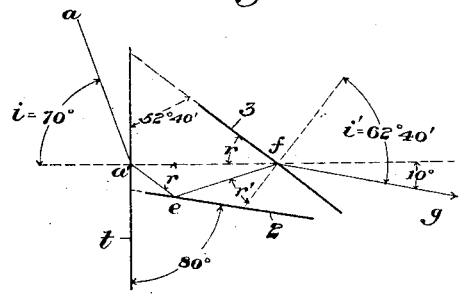
WITNESSES
Thomas W. Bakewell
L. A. Comer
INVENTOR
Frank L. O. Wadsworth No. 749,761. Patented January 19, 1904.

UNITED STATES PATENT OFFICE.

FRANK L. O. WADSWORTH, OF WILLIAMS BAY, WISCONSIN, ASSIGNOR, BY MESNE ASSIGNMENTS, TO PRESSED PRISM PLATE GLASS COMPANY, A CORPORATION OF WEST VIRGINIA.

ILLUMINATING PRISM-PLATE.

SPECIFICATION forming part of Letters Patent No. 749,761, dated January 19, 1904.

Application filed April 25, 1898. Serial No. 678,743. (No model.)

*To all whom it may concern:*

Be it known that I, FRANK L. O. WADSWORTH, of Williams Bay, in the county of Walworth and State of Wisconsin, have invented a new and useful Improvement in Illuminating Prism-Plates, of which the following is a full, clear, and exact description, reference being had to the accompanying drawings, forming part of this specification, in which—

Figures 1 and 3 illustrate the manner in which the light is deflected by my improved prism-plate. Fig. 2 shows my improved plate, and Fig. 4 is a diagram illustrating the manner in which the angles of the prism elements may be determined.

My invention pertains to illuminating prism-plates; and its object is to obtain a form which is more efficient than the form previously in use and which will take the light from a given direction from outside and deliver the whole in the room at a desired point with minimum loss.

In the older forms too little attention seems to have been paid to accurately determining the path of the rays through the glass, and the result has been that many of such structures have been very inefficient in their performance.

Fig. 1 illustrates the operation of my prism-plates which has been designed particularly for rays coming in the direction of the principal rays 8 9. (Shown in Fig. 3.) The principal rays 8 9 8 9 falling upon any one element P' of the prism-plate A are refracted at the face $t$, fall upon the face 2, are there totally reflected to the face 3, from which they emerge in the desired direction 14 15. When thus constructed, the prism-plate also acts very efficiently in receiving the rays 11 9 and 10 9 and transmitting them into the room. Thus the rays 11 9, falling upon the surface $t$, are refracted to the surface 2 of the prism elements in the direction 9 17, are there totally reflected in the direction 17 18 17 18 to the face 3, from which they emerge in the direction 18 19 18 19. The rays coming from the direction 10 9 10 9 are likewise refracted at the face $t$ in the direction of 9 20. A portion of these rays strike the upper surface 3 of the prism elements, as at 21, are totally reflected therefrom in the direction 21 22 to the face 2, from which they are again totally reflected in the direction 22 23 to the face 3, from which they finally emerge in the direction 23 24. The remainder of the rays 10 9 fall directly after refraction at the face $t$ on the face 2, as at 20 20, are reflected therefrom in the direction 20 25 to the face 3, and finally emerge from the latter in the direction of 25 26. The whole body of light falling on the front surface of the prism-plate between the direction 11 9 and 10 9 is therefore transmitted into the room in nearly the direction required to produce the most efficient illuminating effect, the rays 11 9 11 9 emerging somewhat more nearly horizontally than the principal desired direction of emergence, and the main body of the rays 10 9 10 9 emerging at a slightly greater angle to the horizontal than the latter.

In designing a prism-plate in accordance with my invention it must be recognized, first of all, that the main body of light which can be utilized in producing an increased illuminating effect in the apartment generally comes principally from one direction, which can be determined beforehand. Thus in Fig. 3, which illustrates in cross-section a narrow street 4, with two buildings 5 5' opposite each other, the main body of the light which can be obtained and utilized in illuminating an apartment 6 through the window 7 comes from the direction indicated by the line 8 9, which is a line drawn through such a point in the opening of the street between the two buildings that about an equal volume of light passes to the window on each side of this point. The extreme ray 10 9 on one side is determined by the cornice of the building opposite to the building 5, in which the window 7 is situated, and the extreme ray 11 9 on the other side is determined by the top reveal of the window itself. As shown in Fig. 3, the inclination of the principal direction of illumination 8 9 as thus determined is about twenty degrees to the vertical, and as this illustrates a very common case I have assumed this inclination of the principal incident rays in working out my form of prism-plate.

As a second condition in the problem I require that the rays emerging from the inner side of the prism-plate shall pass into the room in a definite direction. As the prism-plate usually fills the upper sash of the window only, as shown on Fig. 3, the rays which pass therefrom into the apartment should generally be directed slightly downward rather than horizontally in order to more fully illuminate desks, cases, and other objects on which they may fall. Generally this direction will be about ten degrees below the horizontal to produce the best effects; but it will of course vary somewhat with the height of the upper sash of the window above the floor and with the size of the apartment to be illuminated. In working out the prism-plate, however, I have assumed the angle of emergence to be ten degrees below the horizontal. Referring to Fig. 4, starting with the ray $a\,a'$ I first trace out its direction after refraction at the first surface $t$ of the prism-plate, as already described. It is evident that a first requirement in the design of the prism-plate is that the face 3 shall be inclined at such an angle as not to intercept any of the rays $f\,g$. I therefore make the faces 3 of the prism elements either parallel to the direction $a'\,e$ or inclined to the face $t$ at a larger angle than the angle of refraction $r$, Fig. 4.

Having thus determined upon and laid out the necessary inclination of the face 3, I proceed to determine the inclination of the remaining face 2 of the prism elements in the following manner: Assuming the rays to emerge from the faces 3 in the desired direction $f\,g$, the direction of these rays before refraction at the face 3 is determined and found to be $f\,e$, and since this ray is the same as the rays $a'\,e$, entering the glass at the face $t$, it follows that in order to be sent in the desired direction by reflection at the face 2 I must make the inclination of said face such that it makes equal angles with the lines $a'\,e$ and $e\,f$.

In any given case the inclination of the incident rays of light to the face of the prism-plate being known, I proceed as follows in order to determine the precise angles of the faces 2 and 3 with the face $t$ which will give the best results, in all cases these angles being both less than a right angle.

As already stated, when light falls on the plane face of transparent material at an angle $i$ to the normal to the surface, Fig. 4, it passes into the material at such an angle as to fulfil the relation $\sin. i = n \sin. r$. In the case I have considered the prism-plate is further usually placed so that its entrance-face $t$ is practically vertical. Hence if the angle of inclination of the principal light-rays to the vertical is twenty degrees the angle of incidence $i$ is seventy degrees. The index of refraction $n$ of the glass from which these prism-plates are usually constructed is about 1.55. Using these values, I find for the angle of refraction $r$, equals thirty-seven degrees minus twenty minutes. This, as already stated, determines the angle of the face 3, which should be equal to or less than this angle. Assuming it equal to this angle, I can at once determine the angle of the face 2, as in Fig. 4, for the angle $i''$, which the emergent ray $f\,g$ makes with the face 3, is the complement of the angle of refraction (thirty-seven degrees twenty minutes, already determined) less the inclination to the horizontal (ten degrees) of the emergent rays, or sixty-two degrees minus forty minutes. The angle of refraction $r'$ of these rays to the face 3 is therefore (as determined from the above relation) thirty-five degrees. The angle which the refracted ray $f\,e$ makes with the perpendicular $a'\,f$ to the surface $t$ is therefore ninety degrees minus $(r'+r)$ or seventeen degrees forty minutes. The angle $a'\,e\,f$ at the base of the triangle is therefore one hundred and eighty degrees minus thirty-seven degrees twenty minutes plus seventeen degrees forty minutes, or one hundred and twenty-five degrees. Hence as the face 2 must make equal angles to the line of $a'\,e$ and $e\,f$ it must be inclined to both these lines at an angle equal to one-half of one hundred and eighty degrees minus one hundred and twenty-five degrees, or twenty-seven and one-half degrees, and the face 2 is therefore inclined to the perpendicular to the face $t$ at an angle of thirty-seven degrees and twenty minutes minus twenty-seven and one-half degrees, or at an angle of nine degrees and fifty minutes—say in round numbers ten degrees. The actual inclination of the faces 3 and 2 to the front face $t$ of the prism-plate will therefore be finally the complements of the angle $r$ (thirty-seven degrees and twenty minutes) and the angle (ten degrees) just determined, or respectively eighty degrees and fifty-two degrees forty minutes. Hence the angle between these faces themselves will be substantially thirty degrees. More generally the angle between these faces themselves will be substantially thirty degrees.

In order to secure the desired direction of emergence $f\,g$, both the face 2 and the face 3 must always be planes and must be inclined to the face $t$ when the latter is vertical at an angle less than ninety degrees.

Prism-plates as heretofore constructed have been formed of one integral piece of glass, which may be cast or otherwise formed. When formed in this way, however, it is not practicable to grind and polish the faces 2 3 of the prism. They must be used in a rough state. It has not been possible heretofore to utilize such prism-plates otherwise than in pieces or blocks of a few inches square set in metal frames and thus held together in the window-sash. The construction shown in Fig. 2 enables me to grind and polish the faces of the prisms economically, so as to secure a highly-finished article and to make a prism-plate of any desired size without intermediate metallic framing.

As shown in Fig. 2, the prisms are made in separate pieces, having faces 2 3, the angles of which are determined, as above explained, and having meeting faces C C', which are parallel to one of the faces of the prism elements. These separate prism elements are therefore of quadrilateral cross-section (preferably trapezoidal) and may be easily and cheaply made of any desired size from strips of plate-glass.

The prism elements are assembled with the faces C C' in optical contact and may be held together by suitable transparent cement, such as Canada balsam, interposed between said faces. I thus obtain a prism-plate of continuous transparent material—i. e., with no metallic framing between the prism elements. It is necessary that the faces $c$ $c'$ be in optical contact, so as to form a plate of substantially continuous transparent material, as otherwise the rays which meet these surfaces would be reflected thereat instead of passing through to the proper reflecting-faces 2 2 of the prism element below, and the action of the prism-plate on these rays would be completely altered in character. The cementing together of these faces gives to the whole structure a rigidity and waterproof character not secured when the prism elements are simply placed in ordinary contact, and I am enabled in this construction to build up a prism-plate of any desired size without the use of metallic framing-strips, clips, or other devices which would interfere with the transmission of light through the plate in the desired manner. The whole prism-plate when so constructed can be mounted in an ordinary window frame or sash. In some cases I may also apply to the outer face of the prism-plate a plate or sheet of glass T.

I claim—

1. An illuminating prism-plate built up of a series of individual prism elements quadrilateral in cross-section, the meeting faces of the prisms being parallel and in optical contact.

2. A prism-plate of continuous transparent material constituted of a number of separately-formed prism elements of trapezoidal section with their parallel sides in optical contact with each other; substantially as described.

3. A prism-plate of continuous transparent material, constructed of a number of separately-formed prism elements of trapezoidal section with their parallel faces cemented together with transparent cement; substantially as described.

4. A prism-plate of continuous transparent material constructed of a number of similar separately-formed prism elements of trapezoidal section, with plain parallel sides in optical contact with each other, and the shorter of the remaining sides forming a continuous plane surface; substantially as described.

5. A prism-plate of continuous transparent material constructed of a number of similar separately-formed prism elements of trapezoidal section, with plain parallel sides in optical contact with each other, the shorter of the remaining sides forming a continuous plane surface, and an outer plain sheet of glass applied to said surface.

6. A prism-plate built up of a series of prism elements, each of trapezoidal cross-section with the parallel faces $c$, $c'$ of the same in optical contact, and with the longer of the two remaining faces inclined to the faces $c$, $c'$ at an angle of substantially thirty degrees; substantially as described.

In testimony whereof I have hereunto set my hand.

FRANK L. O. WADSWORTH.

Witnesses:
G. B. BLEMMING,
L. M. REDMAN.